US008526370B2

(12) United States Patent
Zhang et al.

(10) Patent No.: US 8,526,370 B2
(45) Date of Patent: Sep. 3, 2013

(54) METHOD, SYSTEM AND DEVICE FOR DISTRIBUTING RESOURCE OF BASE STATION NODE

(75) Inventors: Jianzhi Zhang, Shenzhen (CN); Hongcheng Zhuang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 1281 days.

(21) Appl. No.: 12/110,521

(22) Filed: Apr. 28, 2008

(65) Prior Publication Data

US 2008/0198831 A1   Aug. 21, 2008

Related U.S. Application Data

(63) Continuation of application No. PCT/CN2007/000165, filed on Jan. 17, 2007.

(30) Foreign Application Priority Data

Jan. 19, 2006 (CN) .......................... 2006 1 0003809

(51) Int. Cl.
*H04W 4/00* (2009.01)
(52) U.S. Cl.
USPC ........ 370/329; 370/310.2; 370/349; 370/437; 455/422.1; 455/450
(58) Field of Classification Search
USPC .............. 370/310.2, 328–339, 341, 349, 436, 370/437, 478; 455/422.1, 450, 452.1, 452.2
See application file for complete search history.

(56) References Cited

U.S. PATENT DOCUMENTS

| 6,738,624 B1 * | 5/2004 | Aksentijevic et al. ..... 455/452.1 |
| 2004/0192326 A1 * | 9/2004 | Stern-Berkowitz et al. .. 455/453 |

(Continued)

FOREIGN PATENT DOCUMENTS

| CN | 1722859 A | 1/2006 |
| CN | 1722860 A | 1/2006 |

(Continued)

OTHER PUBLICATIONS

3$^{rd}$ Generation Partnership Project, "Technical Specification Group Radio Access Network; UTRAN Lub Interface Node B Application Part (NBAP) Signalling (Release 6)," 1-747(Dec. 2005).

(Continued)

*Primary Examiner* — Hoon J Chung
(74) *Attorney, Agent, or Firm* — Leydig, Voit & Mayer, Ltd.

(57) ABSTRACT

A method, system and device for distributing resources of a base station node (Node B) are disclosed to enable F-DPCH resources of a local cell to be sufficiently used. In this invention, Node B reports to the RNC the F-DPCH capability of the local cell so as to provide a decision-making basis about using or not using the F-DPCH to the RNC. If the local cell supports F-DPCH, when the UE initiates an RRC connection establishment request, the RNC instructs the Node B to distribute the F-DPCH and HSDPA resources to the UE, otherwise the RNC instructs the Node B to distribute DPDCH and DPDCCH resources to the UE. The F-DPCH capability of the local cell can be reported in a newly added IE or extended existing IE of the Audit Response message and Resource Status Indication message.

17 Claims, 4 Drawing Sheets

(56) References Cited

U.S. PATENT DOCUMENTS

| | | | |
|---|---|---|---|
| 2005/0233734 A1 | 10/2005 | Rajkotia et al. | |
| 2007/0104167 A1* | 5/2007 | Nakamata et al. | 370/338 |
| 2007/0178902 A1* | 8/2007 | Guethaus et al. | 455/442 |
| 2008/0049683 A1* | 2/2008 | Nakamata et al. | 370/335 |

FOREIGN PATENT DOCUMENTS

| | | |
|---|---|---|
| GB | 2371183 A | 7/2002 |
| WO | WO 2005/094100 A1 | 10/2005 |
| WO | WO 2006/005240 A1 | 1/2006 |

OTHER PUBLICATIONS

"Universal Mobile Telecommunications System (UMTS; UTRAN Iub Interface Node B Application Part (NBAP) signaling (3GPP TS 25.433 version 6.8.0 Release 6); ETSI TS 125 433," *ETSI Standards*, 3-R3(V6.8.0):1-67 (Dec. 2005).

Written Opinion of the International Searching Authority in corresponding PCT Application No. PCT/CN2007/000165 (Apr. 26, 2007).

1st Office Action in corresponding European Application No. 07702097.2 (Feb. 17, 2010).

2nd Office Action in corresponding European Application No. 07702097.2 (Oct. 6, 2010).

"3GPP TS 25.433—Radio Link Setup," Dec. 2005, Version 6.8.0, 3rd Generation Partnership Project, Valbonne, France.

"3GPP TS 25.306—Technical Specification Group Radio Access Network; UE Radio Access capabilities (Release 6)," Dec. 2005, Version 6.7.0, 3rd Generation Partnership Project, Valbonne, France.

"3GPP TS 25.331—Radio Resource Control (RRC); Protocol specification," Dec. 2005, Version 6.8.0, 3rd Generation Partnership Project, Valbonne, France.

International Search Report in corresponding PCT Application No. PCT/CN2007/000165 (Apr. 26, 2007).

3rd Office Action in corresponding European Application No. 07702097.2 (Jul. 22, 2011).

1st Office Action in corresponding European Patent Application No. 12155259.0 (Jan. 23, 2013).

4th Office Action in corresponding European Application No. 07702097.2 (Mar. 27, 2012).

Extended European Search Report in European Application No. 12155259.0 (Mar. 28, 2012).

3rd Generation Partnership Program (3GPP), Huawei, "F-DPCH Cell Capability Enhancement," 3GPP TSG-RAN3 Meeting #51, Change Request, Tdoc R3-060113, Denver, U.S.A. (Feb. 13-17, 2006).

5th Office Action in corresponding European Patent Application No. 07702097.2 (Apr. 23, 2012).

Reasons for Rejection in corresponding Office Action in corresponding Japanese Application No. 2008-550615 (Mar. 23, 2011).

Reasons for Rejection in corresponding Office Action in corresponding Japanese Application No. 2008-550615 (Jul. 22, 2011).

"R3-060314—F-DPCH Cell Capability Enahncement," 3GPP TSG-RAN3 Meeting #51, Feb. 13-17, 2006, 3rd Generation Partnership Project, Denver, Colorado.

* cited by examiner

METHOD, SYSTEM AND DEVICE FOR DISTRIBUTING RESOURCE OF BASE STATION NODE

CROSS-REFERENCE TO RELATED APPLICATIONS

This application is a continuation of International Patent Application No. PCT/CN2007/000165, filed Jan. 17, 2007, entitled Method for Distributing Resources of Base Station Node," which claims priority to Chinese Patent Application No. 200610003809.5, filed on Jan. 19, 2006, also entitled "Method for Distributing Resources of Base Station Node" the entire disclosures of which are hereby incorporated by reference in their entirety.

FIELD OF THE INVENTION

The present invention relates to mobile communication technology, and particularly relates to a method and a device for distributing resources of a mobile communication system and a base station node thereof.

BACKGROUND OF THE INVENTION

Both High Speed Downlink Packet Access (HSDPA) technology and High Speed Uplink Packet Access (HSUPA) technology are important evolutions of the Third Generation (3G) mobile communication technology. Data packet scheduling, retransmitting, etc. of HSDPA and HSUPA are controlled by a base station node (Node B hereafter). This kind of control has higher speed and may adapt to channel changes better, reduce transmission delay and increase data throughput.

Two downlink physical channels and one uplink physical channel are newly added in the HSDPA technology for high-speed transmission of data of a User Equipment (UE), which are respectively a High Speed Physical Downlink Shared Channel (HS-PDSCH) for bearing downlink user data, a High Speed Shared Control Channel (HS-SCCH) for bearing downlink control information and a High Speed Dedicated Physical Control Channel (HS-DPCCH) for bearing uplink feedback information of the UE. The base station gets information through the HS-DPCCH about whether the data is correctly received, and if not, initiates retransmission; otherwise, transmits new data.

As a special downlink dedicated channel, a Fractional-Dedicated Physical Channel (F-DPCH) combined with the HSDPA technique may replace a downlink Dedicated Physical Data Channel (DPDCH)/Dedicated Physical Control Channel (DPCCH) to effectively improve the utilization efficiency of a downlink channelization code, and has been introduced in the prior art. Thus, when a subscriber conducts Packet Switch (PS) domain related services, such as Voice over IP (VoIP), the F-DPCH may be used in cooperation with the HSDPA on the downlink to map the Signaling Radio Bearing (SRB) to the HSDPA without the need of distributing a separated downlink dedicated physical channel resource, thereby improving the downlink capacity and utilization efficiency of the downlink channelization code of the system.

The definition of the capability of a UE for supporting the F-DPCH is expressed by an Information Element (IE) supporting the HS-PDSCH: if the UE supports the HS-PDSCH, it must support the F-DPCH too. However, as it is not defined in the capability set of a local cell of the Node B whether the local cell supports the F-DPCH, the Controlling Radio Network Controller (CRNC) is not able to know whether the local cell of the Node B supports the F-DPCH.

As shown in FIG. 1, a method for distributing resources of a Node B includes the following processes. In process 101, a Serving Radio Network Controller (SRNC)/CRNC transmits an Audit Request message to the Node B. In process 102, the Node B returns an Audit Response message. In process 103, the SRNC/CRNC is not able to know whether the local cell supports the F-DPCH on receiving the response message. In process 104, a cell is established on the local cell. In process 105, a UE in the cell which uses the services provided by the local cell requests establishment of a Radio Resource Control (RRC) connection, i.e. establishment of a signaling connection in the PS domain. In process 106, the SRNC/CRNC instructs the Node B to distribute a DPDCH and a DPCCH for the UE to bear the data and signaling of the UE. The SRNC/CRNC transmits a Radio Link Establishing Request message to the Node B according to the distribution instruction. No F-DPCH channel information is carried in the request message.

Therefore, the F-DPCH is not used with the Radio Resource Control (RRC) connection established between the RNC and the UE. In practical applications, the above-mentioned solution has the disadvantage that F-DPCH resources are not sufficiently used.

A major reason for the problem is that the RNC is not able to obtain the F-DPCH capability information of the Node B, which makes the RNC not capable of dynamically adjusting strategy of distributing F-DPCH resources, and thus F-DPCH resources cannot be sufficiently used.

SUMMARY OF THE INVENTION

According to embodiments of the present invention, a method, a system and a device are provided for distributing resources of a Node B, by which F-DPCH resources of a local cell can be used sufficiently.

A method for distributing resources of a Node B according to an embodiment of the present invention includes: reporting, by the Node B, to the RNC the F-DPCH capability information of the local cell pertained to the Node B; making, by the RNC, a decision on distribution of resources of the Node B according to the information reported by the Node B, and transmitting a resource distribution instruction to the Node B according to the decision; and distributing, by the Node B, the resources according to the resource distribution instruction.

Another embodiment of the present invention provides a Node B including: a Capability Information Reporting Unit for reporting F-DPCH capability information of a local cell to an RNC; an Allocation Instruction Receiving Unit for receiving a resource distribution instruction transmitted from the RNC according to F-DPCH capability information reported by the Capability Information Reporting Unit; and a Resource Allocating Unit for distributing resources according to the resource distribution instruction received by the Allocation Instruction Receiving Unit.

Yet another embodiment of the present invention provides a Radio Network Controller including: a Capability Information Obtaining Unit for obtaining F-DPCH capability information reported by a Node B; a Decision Making Unit for performing decision-making on distribution of resources of the Node B according to the F-DPCH capability information obtained by the Capability Information Obtaining Unit; and an Allocation Instruction Transmitting Unit for transmitting a resource distribution instruction to the Node B according to the decision made by the Decision Making Unit.

Yet another embodiment of the present invention provides a mobile communication system including a Node B and an RNC; the Node B is adapted to report F-DPCH capability information of a local cell to the RNC, receive resource distribution instructions from the RNC and distribute resources according to the instruction; the RNC is adapted to obtain the reported F-DPCH capability information, perform decision-making on resource distribution of the Node B according to the capability information and transmit resource distribution instructions to the Node B.

In the embodiments of the present invention, the Node B reports F-DPCH capability of a local cell to the RNC, which provides a decision-making basis for the RNC to determine whether to use an F-DPCH. The RNC is able to know the F-DPCH capability of the local cell of the Node B accurately based on the reported F-DPCH capability information of the local cell, which facilitates the decision-making of the RNC on use of F-DPCH resources, thereby utilizing the combination of F-DPCH and HSDPA sufficiently to improve the downlink capacity and utilization efficiency of the downlink channelization code of the system.

DETAILED DESCRIPTION OF THE EMBODIMENTS

The present invention will now be further described with reference to the accompanying drawings for better understanding of the objects, technical solutions and advantages thereof.

According to embodiments of the present invention, the F-DPCH capability of a local cell of a Node B is indicated by introducing a new Information Element (IE) or extending an original IE in the capability set of local cells of the Node B Application Part (NBAP) protocol, thereby providing a decision-making basis for the RNC to determine whether to use an F-DPCH.

Figure 1:
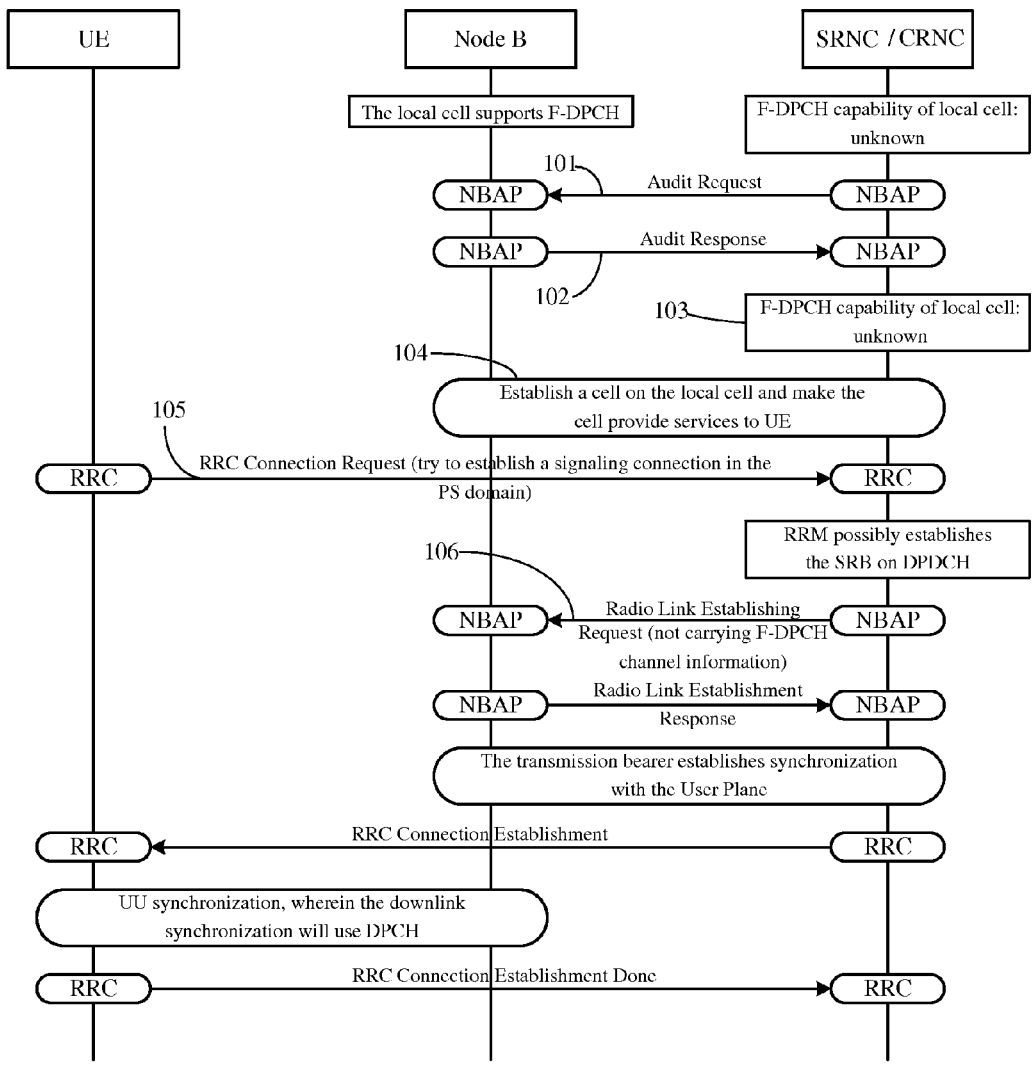
FIG. 1 is a flow chart illustrating a conventional method for distributing resources of a Node B.
Figure 2:
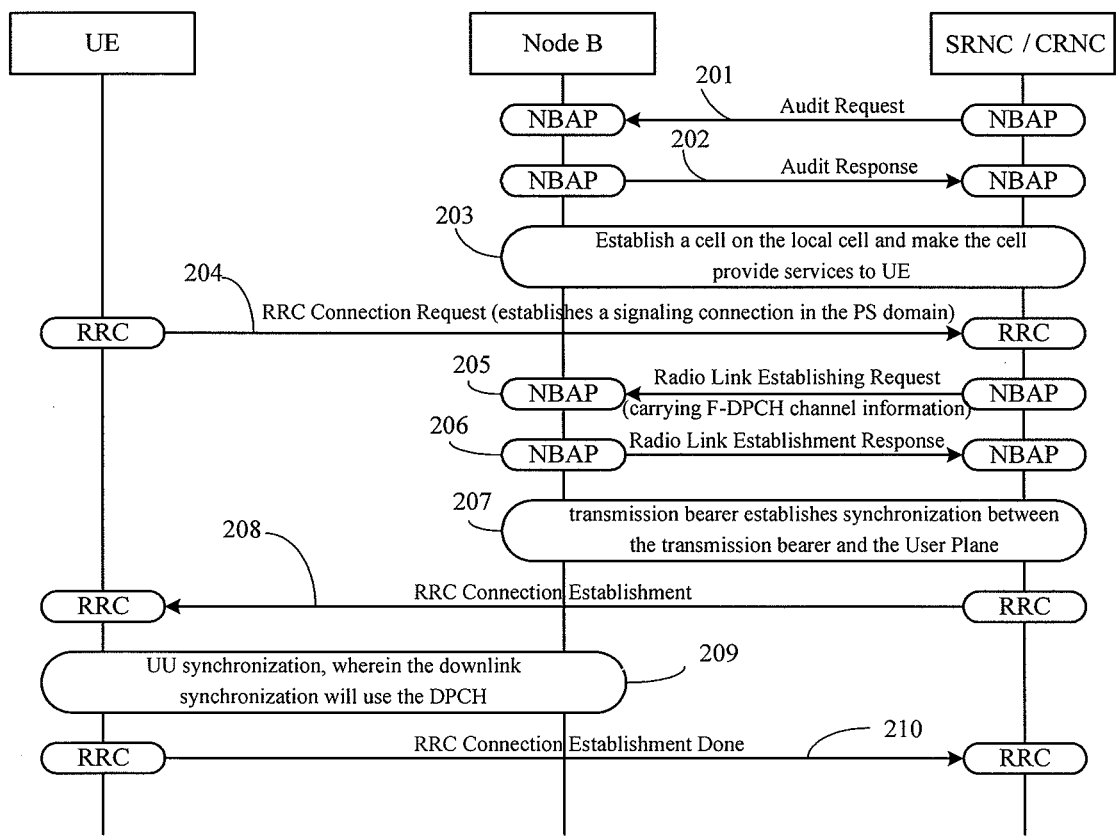
FIG. 2 is a flow chart illustrating a method for distributing resources of a Node B according to a first embodiment of the present invention.

A method for distributing resources of a Node B according to a first embodiment of the present invention is shown in FIG. 2, wherein the RNC performs decision-making on resource distribution according to the F-DPCH capability information audited and reported by the Node B.

In process 201, the SRNC/CRNC transmits an Audit Request message to the Node B.

In process 202, the Node B returns an Audit Response message reporting information about whether a local cell belonging to the Node B supports F-DPCH in this message according to newly added IE information in the capability set of the local cell belonging to the Node B.

The newly added IE information is added in Local Cell Information which is a part of the Audit Response message. The newly added IE may be referred to as "F-DPCH Capability (Fractional-Dedicated Physical Channel Capability)", an implementation form of which is shown in Table 1. Definition of headings of Table 1 and description about IEs except for "F-DPCH Capability" as shown in Table 1 both can be found in specification 3GPP TS 25.433 V6.8.0 established and maintained by The 3rd Generation Partnership Project (3GPP). The specification is hereby incorporated by reference in its entirety and for everything it describes.

TABLE 1

| Information Element/Group name | Presence | Range | Type and reference | Semantics description | Criticality | Assigned Criticality |
|---|---|---|---|---|---|---|
| The above parts of Audit Response message are omitted | | | | | | |
| Local Cell Information | | 0 ... <max LocalCell inNodeB> | | | EACH | Ignore |
| >Local Cell ID | M | | 9.2.1.38 | | — | |
| >DL Or Global Capacity Credit | M | | 9.2.1.20B | | — | |
| >UL Capacity Credit | O | | 9.2.1.65A | | — | |
| >Common Channels Capacity Consumption Law | M | | 9.2.1.9A | | — | |
| >Dedicated Channels Capacity Consumption Law | M | | 9.2.1.20A | | — | |
| >Maximum DL Power Capability | O | | 9.2.1.39 | | — | |
| >Minimum Spreading Factor | O | | 9.2.1.47 | | — | |
| >Minimum DL Power Capability | O | | 9.2.1.46A | | — | |
| >Local Cell Group ID | O | | 9.2.1.37A | | — | |
| >Reference Clock Availability | O | | 9.2.3.14A | TDD only | YES | Ignore |
| >Power Local Cell Group ID | O | | 9.2.1.49B | | YES | Ignore |
| >HSDPA Capability | O | | 9.2.1.31Ga | | YES | Ignore |
| >E-DCH Capability | O | | 9.2.2.13J | | YES | Ignore |
| >E-DCH TTI2ms Capability | C-EDCH Capability | | 9.2.2.13V | | YES | Ignore |

TABLE 1-continued

| Information Element/Group name | Presence | Range | Type and reference | Semantics description | Criticality | Assigned Criticality |
|---|---|---|---|---|---|---|
| >E-DCH SF Capability | C-EDCH Capability | | 9.2.2.13W | | YES | Ignore |
| >F-DPCH Capability | O | | 9.#.#.# | | YES | Ignore |
| The following parts of Audit Response message are omitted | | | | | | |

Wherein M means Mandatory, O means Optical, C means Conditional, and EDCH means Enhanced Dedicated Channel, DL means downlink, UL means uplink, SF means spread factor.

In an embodiment of the present invention, the specific definition of the IE "F-DPCH Capability" can be as shown in Table 2. Definition of headings of Table 2 can be found in specification 3GPP TS 25.433 V6.8.0.

TABLE 2

| IE/ Group Name | Presence | Range | IE Type and Reference | Semantics Description |
|---|---|---|---|---|
| F-DPCH Capability | O | | ENUMERATED (F-DPCH Capable, F-DPCH non Capable) | |

In process 203, on receiving the response message, the SRNC/CRNC knows that the local cell supports F-DPCH according to the newly added IE information and establishes a cell on the local cell.

In process 204, the UE in the cell (which uses services provided by the local cell) requests establishment of an RRC connection, i.e. establish a signaling connection in the PS domain.

In process 205, because the information reported by the Node B shows that the local cell supports F-DPCH, on receiving the RRC Connection Establishing Request initiated by the UE, the SRNC/CRNC instructs the Node B to distribute F-DPCH and HSDPA channel resources for the UE to bear the signaling and data of the UE.

The SRNC/CRNC transmits a Radio Link Establishing Request message to the Node B according to the distribution instruction, and the F-DPCH channel information is carried in the Radio Link Establishing Request message.

In process 206, the Node B returns a Radio Link Establishing Response message.

In process 207, the transmission bearer between the Node B and SRNC/CRNC is synchronized with the User Plane.

In process 208, the SRNC/CRNC transmits an RRC Connection Establishing message to the UE.

In process 209, a UU (an interface between the RNC and the UE) is synchronized, wherein the F-DPCH will be used in the downlink synchronization.

In process 210, the UE returns an RRC Connection Establishing Done message.

According to the above described auditing and reporting method, those skilled in the art should appreciate that the RNC may know the F-DPCH capability of the local cell of the Node B accurately by periodically auditing and reporting the real-time F-DPCH capability information of the local cell, which facilitates the decision-making of the RNC on using F-DPCH resources, thereby sufficiently utilizing the combination of F-DPCH and HSDPA to improve the downlink capacity and utilization efficiency of the downlink channelization code of the system.

In addition, it should be explained that if the local cell does not support F-DPCH, the SRNC/CRNC may use the method of the prior art to distribute resources, for example, the SRNC/CRNC may instruct the Node B to distribute DPDCH and DPCCH for the UE to bear the signaling and data of the UE.

Figure 3:
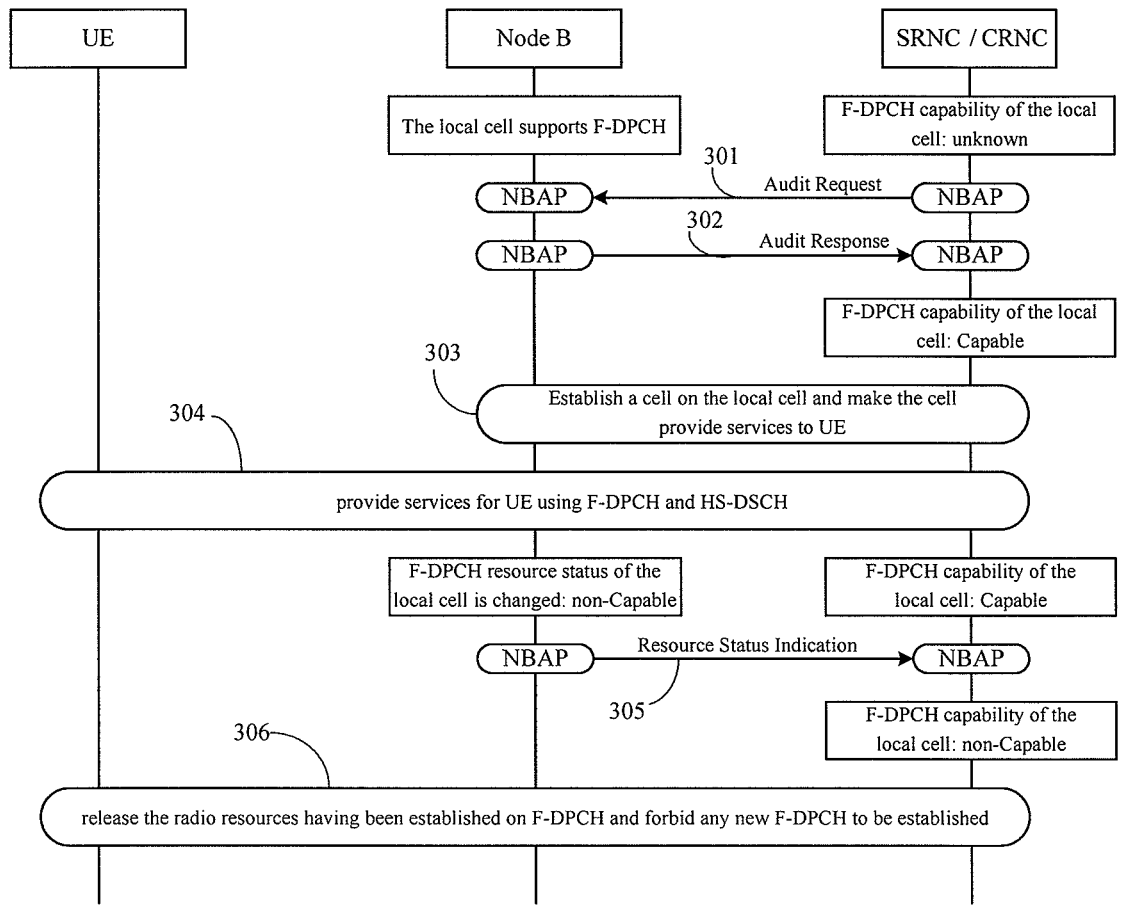
FIG. 3 is a flow chart illustrating a method for distributing resources of a Node B according to a second embodiment of the present invention.

A method for distributing resources of the Node B according to a second embodiment of the present invention is shown in FIG. 3. Besides obtaining real-time F-DPCH capability information of the local cell according to the above described periodically auditing and reporting method, it is also possible to obtain F-DPCH capability information of the local cell by reporting the change information using a Resource Status Indication message when the resource status of the local cell is changed.

In process 301, no F-DPCH capability information of the local cell presents in the SRNC/CRNC, and the SRNC/CRNC transmits an Audit Request message to the Node B.

Process 302 is similar to process 202, the Node B reports the capability information to the SRNC/CRNC using an Audit Response message that, for example, the local cell supports F-DPCH.

Process 303 is similar to process 203, the SRNC/CRNC knows based on the Audit Response message that F-DPCH capability of the local cell is "Capable", and establishes a cell on the local cell.

In process 304, through the F-DPCH and HS-DSCH, the UE uses services provided by the cell that is provided with services by the local cell.

In process 305, once the resource status of the local cell is changed, for example, the F-DPCH capability of the local cell is changed from "Capable" to "non-Capable" due to a single board fault, the Node B reports the change information to the SRNC/CRNC by means of a "Resource Status Indication" message.

In the second embodiment of the present invention, taking as an example that the F-DPCH capability of the local cell changes from "Capable" to "non-Capable", the changed F-DPCH capability information (non-Capable) may be carried in the "Resource Status Indication" message as shown in Table 3. Definition of headings of Table 3 and description about IEs except for "F-DPCH Capability" as shown in Table 3 both can be found in specification 3GPP TS 25.433 V6.8.0.

TABLE 3

| Information Element/group name | Presence | Range | Type and reference | Semantics description | Criticality | Assigned Criticality |
|---|---|---|---|---|---|---|
| The above parts of Resource Status Indication are omitted | | | | | | |
| >No Failure | | | | | | |
| >>Local Cell Information | | 1 ... <max LocalCell inNodeB> | | | EACH | Ignore |

TABLE 3-continued

| Information Element/group name | Presence | Range | Type and reference | Semantics description | Criticality | Assigned Criticality |
|---|---|---|---|---|---|---|
| >>>Local Cell ID | M | | 9.2.1.38 | | — | |
| >>>Add/Delete Indicator | M | | 9.2.1.1 | | — | |
| >>>DL Or Global Capacity Credit | C-add | | 9.2.1.20B | | — | |
| >>>UL Capacity Credit | O | | 9.2.1.65A | | — | |
| >>>Dedicated Channels Capacity Consumption Law | C-add | | 9.2.1.20A | | — | |
| >>>Maximum DL Power Capability | C-add | | 9.2.1.39 | | — | |
| >>>Minimum Spreading Factor | C-add | | 9.2.1.47 | | — | |
| >>>Minimum DL Power Capability | C-add | | 9.2.1.46A | | — | |
| >>>Local Cell Group ID | O | | 9.2.1.37A | | — | |
| >>>Reference Clock Availability | O | | 9.2.3.14A | TDD only | YES | Ignore |
| >>>Power Local Cell Group ID | O | | 9.2.1.49B | | YES | Ignore |
| >>>HSDPA Capability | O | | 9.2.1.31Ga | | YES | Ignore |
| >>>E-DCH Capability | O | | 9.2.2.13J | | YES | Ignore |
| >>>E-DCH TTI2ms Capability | C-EDCH Capability | | 9.2.2.13V | | YES | Ignore |
| >>>E-DCH SF Capability | C-EDCH Capability | | 9.2.2.13W | | YES | Ignore |
| >>>E-DCH Capacity Consumption Law | O | | 9.2.2.13Ja | | YES | Ignore |
| >>>F-DPCH Capability | O | | 9.#.#.# | | NO | Ignore |
| The middle parts are omitted | | | | | | |
| >Service Impacting | | | | | — | |
| >>Local Cell Information | | 0 ... <max LocalCellin NodeB> | | | EACH | Ignore |
| >>>Local Cell ID | M | | 9.2.1.38 | | — | |
| >>>DL Or Global Capacity Credit | O | | 9.2.1.20B | | — | |
| >>>UL Capacity Credit | O | | 9.2.1.65A | | — | |
| >>>Common Channels Capacity Consumption Law | O | | 9.2.1.9A | | — | |
| >>>Dedicated Channels Capacity Consumption Law | O | | 9.2.1.20A | | — | |
| >>>Maximum DL Power Capability | O | | 9.2.1.39 | | — | |
| >>>Minimum Spreading Factor | O | | 9.2.1.47 | | — | |
| >>>Minimum DL Power Capability | O | | 9.2.1.46A | | — | |
| >>>Reference Clock Availability | O | | 9.2.3.14A | TDD only | YES | Ignore |
| >>>HSDPA Capability | O | | 9.2.1.31Ga | | YES | Ignore |
| >>>E-DCH Capability | O | | 9.2.2.13J | | YES | Ignore |
| >>>E-DCH TTI2ms Capability | C-EDCH Capability | | 9.2.2.13V | | YES | Ignore |
| >>>E-DCH SF Capability | C-EDCH Capability | | 9.2.2.13W | | YES | Ignore |
| >>>E-DCH Capacity Consumption Law | O | | 9.2.2.13Ja | | YES | Ignore |
| >>>F-DPCH Capability | O | | 9.#.#.# | | NO | Ignore |
| The following parts of Resource Status Indication are omitted | | | | | | |

Wherein M means Mandatory, O means Optical, C means Conditional, and EDCH means Enhanced Dedicated Channel, DL means downlink, UL means uplink, SF means spread factor.

In process 306, the SRNC/CRNC knows that the F-DPCH capability of the local cell is changed from "Capable" to "non-Capable" according to the message, which leads to an F-DPCH downlink synchronization failure, makes the SRNC/CRNC release radio resources of all UEs using the F-DPCH channel in the cell that uses services provided by the local cell, and forbids any new F-DPCH to be established. Hereafter, the DPDCH/DPCCH and HSDPA will be used to support new service request of the UE.

In addition, it can be understood that some changes, for example, the F-DPCH capability being changed from "non-Capable" to "Capable" (for example, the functions of the single board being extended) and F-DPCH capability being changed from "unknown" to "known", may also be reported by means of a "Resource Status Indication" massage.

In all the above-mentioned embodiments, the F-DPCH capability information is transferred in a newly added IE. It is also possible to extend an existing IE in the "Audit Response" message or "Resource Status Indication" message, and transfer the F-DPCH capability information in the extended IE.

Figure 4:
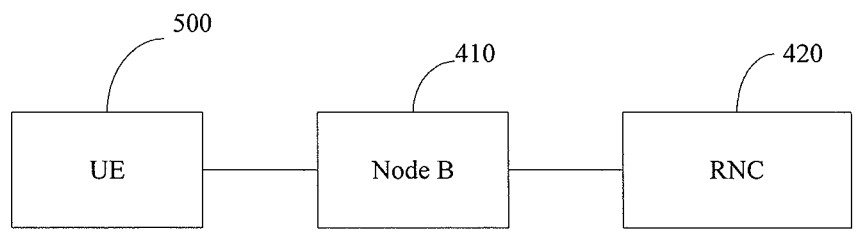
FIG. 4 is a block diagram illustrating a mobile communication system according to an embodiment of the present invention.

With reference to FIG. 4, there is shown a block diagram illustrating a mobile communication system according to an embodiment of the present invention.

The mobile communication system may provide services to a UE 500, which includes a Node B 410 and a Radio Network Controller 420.

The Node B 410 is adapted to report F-DPCH capability information of a local cell to the RNC 420, receive the resource distribution instruction from the RNC 420 and distribute resources according to the instruction.

The RNC 420 is adapted to obtain the reported F-DPCH capability information, perform decision-making on distribution of resources of the Node B 410 according to the capability information, and transmit resource distribution instruction to the Node B 410.

The decision may be made as follows: if the local cell supports F-DPCH, the RNC 420 instructs the Node B 410 to distribute F-DPCH and HSDPA channel resources for the UE 500 to bear the signaling and data upon receiving the RRC Connection Establishing Request initiated by the UE 500 in the cell that uses services provided by the local cell.

The decision-making may also be performed as follows: if the local cell belonging to the Node B 410 does not support F-DPCH, the RNC 420 instructs the Node B 410 to distribute DPDCH and DPCCH resources for the UE 500 to bear the signaling and data upon receiving the RRC Connection Establishing Request initiated by the UE 500 in the cell that uses services provided by the local cell.

In an embodiment, the Node B 410 may report F-DPCH capability information to the RNC 420 by means of a newly added IE or an extended existing IE in the capability set of the local cell to which it belongs. The F-DPCH capability information may be carried in an "Audit Response" message or "Resource Status Indication" message to be transferred to the RNC 420.

Figure 5:
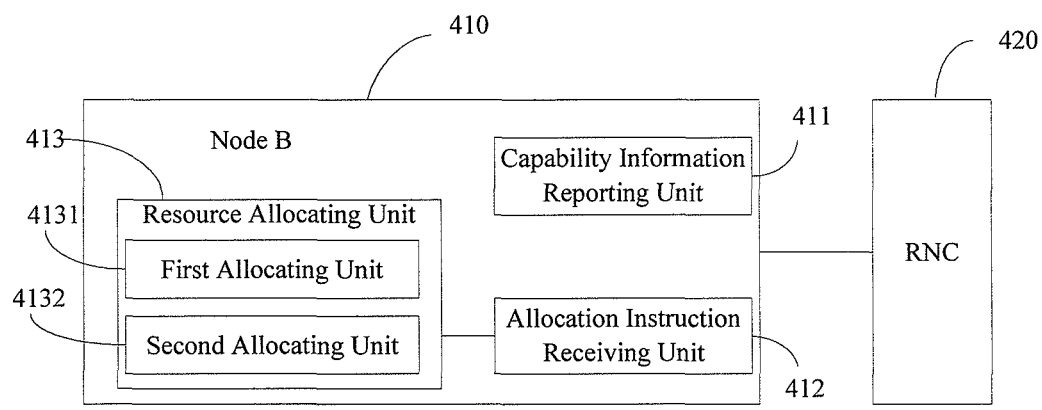
FIG. 5 is a block diagram illustrating in greater detail an embodiment of the Node B shown in FIG. 4.

With reference to FIG. 5, a block diagram illustrating the Node B according to an embodiment of the present invention is shown.

The Node B 410 includes a Capability Information Reporting Unit 411 for reporting F-DPCH capability information of the local cell to the RNC 420; an Allocation Instruction Receiving Unit 412 for receiving a resource distribution instruction transmitted from the RNC 420 according to F-DPCH capability information reported by the Capability Information Reporting Unit 411; a Resource Allocating Unit 413 for distributing the resources according to the resource distribution instruction received by the Allocation Instruction Receiving Unit 412.

The Resource Allocating Unit 413 includes a First Allocating Unit 4131 for distributing F-DPCH and HSDPA resources for a UE to bear signaling and data of the UE when the resource distribution instruction is a first instruction; a Second Allocating Unit 4132 for distributing DPDCH and DPCCH resources for an UE to bear signaling and data of the UE when the resource distribution instruction is a second instruction.

In a specific embodiment, the Capability Information Reporting Unit 411 may be an Audit Reporting Unit. In such a case, the F-DPCH capability information of the local cell shall be carried in an Audit Response message reported to the RNC 420. Alternatively, the Capability Information Reporting Unit 411 may be a Resource Status Change Notifying Unit, and F-DPCH capability information of the local cell is carried in a Resource Status Change message reported to the RNC 420.

The F-DPCH capability information may be represented by a newly added IE or an extended existing IE.

Figure 6:
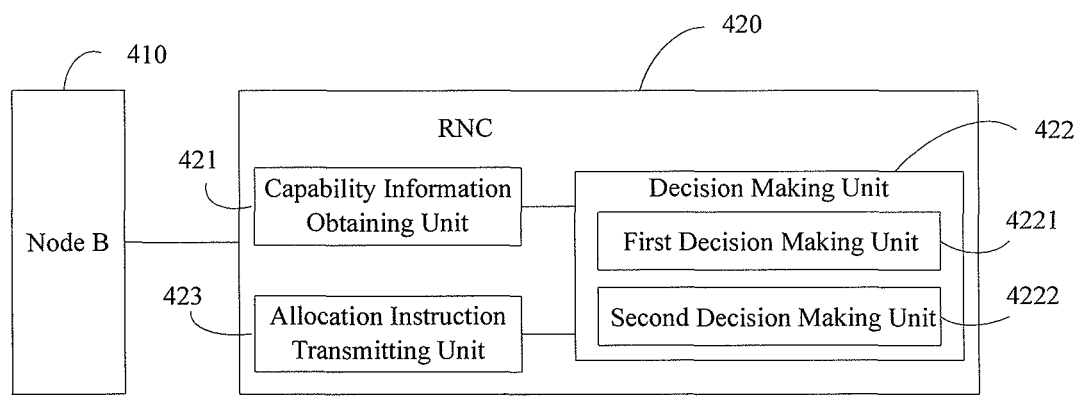
FIG. 6 is a block diagram illustrating in greater detail an embodiment of the RNC shown in FIG. 4.

With reference to FIG. 6, a block diagram illustrating the RNC according to an embodiment of the present invention is shown.

The RNC 420 includes a Capability Information Obtaining Unit 421 for obtaining F-DPCH capability information reported by the Node B 410; a Decision Making Unit 422 for performing decision-making on resource distribution of the Node B 410 according to F-DPCH capability information obtained by the Capability Information Obtaining Unit 421; an Allocation Instruction Transmitting Unit 423 for transmitting a resource distribution instruction to the Node B 410 according to the decision made by the Decision Making Unit 422.

The Decision Making Unit 422 includes a first Decision Making Unit 4221 for instructing the Node B 410 to distribute F-DPCH and HSDPA resources for an UE to bear signaling and data in response to the RRC Connection Establishing Request initiated by an UE when the reported F-DPCH capability information is "Capable".

The Decision Making Unit 422 also includes a second Decision Making Unit 4222 for instructing the Node B 410 to distribute DPDCH and DPCCH resources for the UE to bear signaling and data in response to the RRC Connection Establishing Request initiated by the UE when the reported F-DPCH capability information is "non-Capable."

In a specific embodiment, the Capability Information Obtaining Unit 421 may be an Audit Message Analyzing Unit for obtaining F-DPCH capability information of the local cell from the Audit Response message reported by the Node B 410. Alternatively, the Capability Information Obtaining Unit 421 may be a Resource Status Change Analyzing Unit for obtaining F-DPCH capability information of the local cell from the Resource Status Change message reported by Node B 410.

The F-DPCH capability information may be represented by a newly added IE or an extended existing IE.

The Allocating Instruction Transmitting Unit 423 may be a Radio Link Establishing Request Unit, in such a case, the channel information corresponding to the decision is carried in the request message transmitted by the Radio Link Establishing Request Unit.

While the present invention has been illustrated and described with reference to certain preferred embodiments, the present invention is not limited thereto. Those skilled in the art should recognize that variations and modifications can be made without departing from the scope of the present invention as defined by the accompanying claims.

The invention claimed is:

1. A method for distributing resources of a base station node, Node B, comprising:
    reporting, by the Node B, Fractional-Dedicated Physical Channel capability information of a local cell belonging to the Node B to a Radio Network Controller;
    making, by the Radio Network Controller, a decision on distribution of resources of the Node B according to the Fractional-Dedicated Physical Channel capability information reported by the Node B;

transmitting, by the Radio Network Controller, a resource distribution instruction to the Node B according to the decision; and distributing, by the Node B, resources according to the resource distribution instruction.

2. The method for distributing resources of a Node B according to claim 1, wherein the making a decision on distribution of resources of the Node B comprises:

instructing, by the Radio Network Controller, the Node B to distribute Fractional-Dedicated Physical Channel and High Speed Downlink Packet Access resources for a User Equipment in a cell that uses services provided by the local cell on receiving a Radio Resource Control Connection Establishing Request initiated by the User Equipment if the local cell supports Fractional-Dedicated Physical Channel.

3. The method for distributing resources of a Node B according to claim 1, wherein the making a decision on distribution of resources of the Node B comprises:

instructing, by the Radio Network Controller, the Node B to distribute Dedicated Physical Data Channel and Dedicated Physical Control Channel resources for a User Equipment in a cell that uses services provided by the local cell on receiving a Radio Resource Control Connection Establishing Request initiated by the User Equipment if the local cell does not support Fractional-Dedicated Physical Channel.

4. The method for distributing resources of a Node B according to claim 1, wherein the reporting the Fractional-Dedicated Physical Channel capability information of the local cell belonging to the Node B to the Radio Network Controller comprises:

reporting, by the Node B, the Fractional-Dedicated Physical Channel capability information of the local cell on receiving an Audit message from the Radio Network Controller.

5. The method for distributing resources of a Node B according to claim 4, wherein the Fractional-Dedicated Physical Channel capability information of the local cell is reported through an "Audit Response" message.

6. The method for distributing resources of a Node B according to claim 1, wherein the reporting the Fractional-Dedicated Physical Channel capability information of the local cell belonging to the Node B to the Radio Network Controller comprises:

reporting, by the Node B, the Fractional-Dedicated Physical Channel capability information of the local cell when the Fractional-Dedicated Physical Channel capability information of the local cell is changed.

7. The method for distributing resources of a Node B according to claim 6, wherein the Fractional-Dedicated Physical Channel capability information of the local cell is reported through a "Resource Status Indication" message.

8. The method for distributing resources of a Node B according to claim 1, wherein in reporting the Fractional-Dedicated Physical Channel capability information of the local cell belonging to the Node B to the Radio Network Controller, the Node B utilizes a newly added information element or an extended existing information element to represent the Fractional-Dedicated Physical Channel capability information of the local cell.

9. A base station node, Node B, comprising:

a Capability Information Reporting Unit configured to report Fractional-Dedicated Physical Channel capability information of a local cell to a Radio Network Controller;

an Allocation Instruction Receiving Unit configured to receive a resource distribution instruction transmitted from the Radio Network Controller according to the Fractional-Dedicated Physical Channel capability information reported by the Capability Information Reporting Unit; and a Resource Allocating Unit configured to distribute resources according to the resource distribution instruction received by the Allocation Instruction Receiving Unit.

10. The Node B of claim 9, wherein the Resource Allocating Unit comprises:

a First Allocating Unit configured to distribute Fractional-Dedicated Physical Channel and High Speed Downlink Packet Access resources for an User Equipment when the resource distribution instruction is a first instruction;

a Second Allocating Unit configured to distribute Dedicated Physical Data Channel and Dedicated Physical Control Channel resources for the User Equipment to bear signaling and data when the resource distribution instruction is a second instruction.

11. A Radio Network Controller comprising:

a Capability Information Obtaining Unit configured to obtain Fractional-Dedicated Physical Channel capability information reported by a Node B;

a Decision Making Unit configured to make decision on resource distribution of the Node B according to the Fractional-Dedicated Physical Channel capability information obtained by the Capability Information Obtaining Unit;

an Allocation Instruction Transmitting Unit configured to transmit a resource distribution instruction to the Node B according to the decision made by the Decision Making Unit.

12. The Radio Network Controller of claim 11, wherein the Decision Making Unit comprises:

a first Decision Making Unit configured to instruct the Node B to distribute Fractional-Dedicated Physical Channel and High Speed Downlink Packet Access resources for an User Equipment in response to a Radio Resource Control Connection Establishing Request initiated by the User Equipment when the reported Fractional-Dedicated Physical Channel capability information is "Capable".

13. The Radio Network Controller of claim 12, wherein the Decision Making Unit further comprises:

a second Decision Making Unit configured to instruct the Node B to distribute Dedicated Physical Data Channel and Dedicated Physical Control Channel resources for the User Equipment in response to the Radio Resource Control Connection Establishing Request initiated by the User Equipment when the reported Fractional-Dedicated Physical Channel capability information is "non-Capable".

14. A mobile communication system comprising a Node B and a Radio Network Controller, wherein the Node B is configured to report Fractional-Dedicated Physical Channel capability information of a local cell to the Radio Network Controller, receive a resource distribution instruction from the Radio Network Controller and distribute resources according to the resource distribution instruction;

the Radio Network Controller is configured to obtain the reported Fractional-Dedicated Physical Channel capability information, make decision on resource distribution of the Node B according to the Fractional-Dedicated Physical Channel capability information, and transmit the resource distribution instruction to the Node B.

15. The mobile communication system of claim 14, wherein the Node B comprises:
   a Capability Information Reporting Unit configured to report the Fractional-Dedicated Physical Channel capability information of the local cell to the Radio Network Controller;
   an Allocation Instruction Receiving Unit configured to receive the resource distribution instruction transmitted from the Radio Network Controller according to the Fractional-Dedicated Physical Channel capability information reported by the Capability Information Reporting Unit;
   a First Allocating Unit configured to distribute Fractional-Dedicated Physical Channel and High Speed Downlink Packet Access resources for an User Equipment when the resource distribution instruction is a first instruction; and
   a Second Allocating Unit configured to distribute Dedicated Physical Data Channel and Dedicated Physical Control Channel resources for the User Equipment to bear signaling and data when the resource distribution instruction is a second instruction.

16. The mobile communication system of claim 14, wherein the Radio Network Controller comprises:
   a Capability Information Obtaining Unit configured to obtain the Fractional-Dedicated Physical Channel capability information reported by the Node B;
   a first Decision Making Unit configured to instruct the Node B to distribute Fractional-Dedicated Physical Channel and High Speed Downlink Packet Access resources for an User Equipment in response to a Radio Resource Control Connection Establishing Request initiated by the User Equipment when the reported Fractional-Dedicated Physical Channel capability information is "Capable", and
   an Allocation Instruction Transmitting Unit configured to transmit the resource distribution instruction to the Node B according to the decision of the Decision Making Unit.

17. The mobile communication system of claim 16, wherein the Radio Network Controller further comprises:
   a second Decision Making Unit configured to instruct the Node B to distribute Dedicated Physical Data Channel and Dedicated Physical Control Channel resources for the User Equipment in response to the Radio Resource Control Connection Establishing Request initiated by the User Equipment when the reported Fractional-Dedicated Physical Channel capability information is "non-Capable".

* * * * *